United States Patent
Liu et al.

(10) Patent No.: US 9,369,877 B2
(45) Date of Patent: Jun. 14, 2016

(54) BASE STATION AND METHOD FOR PERFORMING TDD BASE STATION UPLINK/DOWNLINK SUBFRAME CONFIGURATION

(71) Applicant: China Academy of Telecommunications Technology, Beijing (CN)

(72) Inventors: Mei Liu, Beijing (CN); Xueming Pan, Beijing (CN); Zukang Shen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 14/381,281

(22) PCT Filed: Feb. 26, 2013

(86) PCT No.: PCT/CN2013/071887
§ 371 (c)(1),
(2) Date: Aug. 27, 2014

(87) PCT Pub. No.: WO2013/127324
PCT Pub. Date: Sep. 6, 2013

(65) Prior Publication Data
US 2015/0092627 A1    Apr. 2, 2015

(30) Foreign Application Priority Data
Feb. 27, 2012  (CN) .......................... 2012 1 0048151

(51) Int. Cl.
*H04W 16/00* (2009.01)
*H04B 7/26* (2006.01)
(Continued)

(52) U.S. Cl.
CPC .............. *H04W 16/00* (2013.01); *H04B 7/2656* (2013.01); *H04J 3/10* (2013.01); *H04W 16/10* (2013.01);
(Continued)

(58) Field of Classification Search
CPC .............. H04J 11/005; H04J 11/0093; H04W 36/0083; H04W 56/00; H04W 52/0206; H04W 24/10; H04B 7/0632; Y02B 60/50
See application file for complete search history.

(56) References Cited

U.S. PATENT DOCUMENTS

2005/0174954 A1* 8/2005 Yun ........................ H04W 16/32
                                                                       370/310
2007/0264952 A1    11/2007 Buchwald et al.
(Continued)

FOREIGN PATENT DOCUMENTS

CN    101141776 A    3/2008
CN    101242664 A    8/2008
(Continued)

OTHER PUBLICATIONS

International Search Report for PCT/CN2013/071887.
(Continued)

*Primary Examiner* — Jung-Jen Liu
(74) *Attorney, Agent, or Firm* — Kilpatrick Townsend & Stockton LLP

(57) ABSTRACT

The invention discloses a base station and a method of configuring TDD uplink-downlink subframes for base stations, and the method includes: determining a coupling loss between every two of base stations in a preset region; clustering the base stations in the preset region according to the coupling loss between every two of the base stations; and the base stations configuring TDD uplink-downlink subframes according to results of clustering, wherein the base stations in the same cluster are configured with the same TDD uplink-downlink subframe configuration, and the base stations in different clusters are configured with the same TDD uplink-downlink subframe configuration or different TDD uplink-downlink subframe configurations. The invention can lower interference across time slots due to flexible configuration of TDD subframes and optimize the performance of a TDD network system.

20 Claims, 6 Drawing Sheets

(51) Int. Cl.
  *H04W 16/10* (2009.01)
  *H04W 24/02* (2009.01)
  *H04J 3/10* (2006.01)
  *H04W 72/04* (2009.01)
  *H04W 92/20* (2009.01)
  *H04W 88/08* (2009.01)

(52) U.S. Cl.
  CPC ............ *H04W 24/02* (2013.01); *H04W 72/042* (2013.01); *H04W 72/0413* (2013.01); *H04W 72/0426* (2013.01); *H04W 88/08* (2013.01); *H04W 92/20* (2013.01)

(56) References Cited

U.S. PATENT DOCUMENTS

| | | | |
|---|---|---|---|
| 2010/0008282 A1 | 1/2010 | Bhattad et al. | |
| 2010/0042716 A1* | 2/2010 | Farajidana | H04W 16/10 709/224 |
| 2011/0294527 A1* | 12/2011 | Brueck | H04W 24/02 455/466 |
| 2012/0071200 A1* | 3/2012 | Bienas | H04W 48/20 455/525 |
| 2012/0135766 A1* | 5/2012 | Garavaglia | H04B 7/024 455/509 |
| 2012/0172041 A1* | 7/2012 | Krishnamurthy | H04J 11/005 455/436 |
| 2013/0012249 A1* | 1/2013 | Centonza | H04W 72/0426 455/501 |
| 2013/0023285 A1* | 1/2013 | Markhovsky | G01S 3/74 455/456.1 |

FOREIGN PATENT DOCUMENTS

| | | |
|---|---|---|
| CN | 101741710 A | 6/2010 |
| CN | 101753226 A | 6/2010 |
| CN | 102075941 A | 5/2011 |
| WO | 2010/006468 A1 | 1/2010 |
| WO | 2014/043863 A1 | 3/2014 |

OTHER PUBLICATIONS

Written Opinion with translation for PCT/CN2013/071887.

* cited by examiner

Where CL represents a coupling loss; PL represents a path loss; Shadow represents shadow fading; AntGain represents an antenna gain; F1 and F2 represent frequency bands of respective base station nodes respectively; and ACIR represents attenuation across adjacent frequencies

BASE STATION AND METHOD FOR PERFORMING TDD BASE STATION UPLINK/DOWNLINK SUBFRAME CONFIGURATION

This application is a U.S. National Stage of International Application No. PCT/CN2013/071887, filed on Feb. 26, 2013, designating the United States, and claiming the benefit of Chinese Patent Application No. 201210048151.5, filed with the Chinese Patent Office on Feb. 27, 2012 and entitled "Base station and method of configuring TDD uplink-downlink subframes for base stations", which is hereby incorporated by reference in its entirety.

FIELD OF THE INVENTION

The present invention relates to the field of wireless communications and particularly to a base station and a method of configuring TDD uplink-downlink subframes for base stations.

BACKGROUND OF THE INVENTION

For basic duplexing schemes adopted in a cellular system, as illustrated in FIG. 1, a Time Division Duplexing (TDD) mode refers to transmission of uplink-downlink signals in the uplink and the downlink in different periods of time over the same operating frequency band, where there is a Guard Period (GP) between the uplink and the downlink; and a Frequency Division Duplexing (FDD) mode refers to possible transmission of uplink-downlink signals in the uplink and the downlink concurrently over different frequency carriers in different operating frequency bands, where there is a Guard Band (GB) between the uplink and the downlink.

A frame structure of a Time Division-Long Term Evolution (TD-LTE) system is somewhat complicated, as illustrated in FIG. 2, where a radio frame with a length of 10 ms includes 10 subframes in total including special subframes and normal subframes, and each subframe is 1 ms in length. The special subframe includes three time slots: a Downlink Pilot Time Slot (DwPTS) for transmitting a Primary Synchronization Signal (PSS)/Physical Downlink Control Channel (PDCCH)/Physical HARQ Indication Channel (PHICH)/Physical Control Format Indication Channel (PCFICH)/Physical Downlink Shared Channel (PDSCH), etc., a GP for a guard period between the downlink and the uplink, and an Uplink Pilot Time Slot (UpPTS) for transmitting a Sounding Reference Signal (SRS)/Physical Random Access Channel (PRACH), etc. The normal subframes include uplink subframes and downlink subframes for transmitting uplink/downlink control signaling, traffic data, etc.

A radio frame can be configured with two special subframes (in the subframes #1 and #6) or can be configured with one special subframe (in the subframe #1). The subframe #0 and the subframe #5, and the DwPTS time slot(s) in the special subframe(s) are usually used for downlink transmission, the subframe #2 and the UpPTS time slot(s) in the special subframe(s) are usually used for uplink transmission, and the remaining subframes can be configured for uplink transmission or downlink transmission as needed.

In the TD-LTE system, the total length of three time slots DwPTS/GP/UpPTS in a special subframe is 1 ms, as depicted in Table 1, where different configuration conditions for the allocated lengths of these three time slots are supported, and there is a temporal length unit of $T_s$ with $T_s=1/(15000 \times 2048)$ second.

TABLE 1

Configuration format of TD-LTE special subframes

| Configuration No. | Short CP | | | Extended CP | | |
| --- | --- | --- | --- | --- | --- | --- |
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

Seven different allocation schemes of uplink-downlink subframes are supported in the TD-LTE system with their particular configuration parameters as depicted in Table 2, where D represents downlink transmission, U represents uplink transmission, and S represents a special subframe including three time slots DwPTS, GP and UpPTS.

TABLE 2

LTE TDD uplink-downlink subframe configurations

| Configuration Number | Switch periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The special subframe configuration and the uplink-downlink subframe allocation scheme above are broadcasted to all of User Equipments (UEs) in a cell by a base station in System Information (SI).

As can be apparent from the foregoing description, a UE can be instructed by modifying system information to change the two frame configuration parameters above in the TD-LTE standard. The shortest frame configuration modification periodicity of 640 ms supported in the TD-LTE standard has failed to fully accommodate a dynamically variable demand for traffic.

A dynamic solution to allocation of uplink-downlink subframes has been proposed in the prior art as follows:

In a specific period of time, there are four preset types of subframes including subframes fixed for downlink transmission, subframes fixed for uplink transmission, and subframes flexibly allocated for uplink or downlink transmission. As illustrated in FIG. 3, for example, the period of time is one radio frame (which is merely illustrative although an alternative period of time may be also possible), where the subframes #0 and #5 are fixed downlink subframes, the subframes #2 and #7 are fixed uplink subframes, the subframes #1 and #6 are special subframes (or can be classified into fixed downlink subframes), and the remaining subframes (#3, #4, #8 and #9) are subframes allocated flexibly for uplink or downlink transmission. The last type of subframes can be configured dynamically by the base station in view of a real-time traffic demand and a real-time channel condition to accommodate a dynamic change in traffic demand.

A method of configuring dynamically TDD subframes has been proposed in the disclosed solution of the prior art. In a real system, if TDD subframes are configured dynamically so that different cells are preset with different uplink-downlink subframe configurations, then interference across time slots may occur with adjacent cells. The adjacent cells here may be geographically adjacent cells over the same TDD carrier, as illustrated in FIG. 4, and given the same TDD carrier, a downlink signal of a base station in a macro cell may interfere with an uplink signal of a UE in a femto cell, which may in turn interfere with the downlink signal in the macro cell. Alternatively, the adjacent cells can be geographically overlapping or adjacent cells over adjacent TDD carriers, as illustrated in FIG. 5. The adjacent cells here may be cells deployed at the same level. e.g., macro cells deployed at the same level, or can be cells deployed at different levels. e.g., a macro cell and a micro cell etc.

As can be apparent, the problem of interference across time slots accompanying the solution to dynamic configuration of TDD subframes proposed in the prior art has not been addressed yet, thus degrading the performance of the system; and taking a cell as an example, interference thereto in each uplink subframe may be uplink interference of a UE served by an adjacent base station or may be downlink interference of the adjacent base station. If the interference thereto arises from downlink interference from the adjacent base station at a short distance from a cell in question, then there may be strong interference of the adjacent base station to the cell in question, thus possibly resulting in significant interference to the uplink subframe in the cell in question and consequentially deteriorating the performance of the system. As a result, the performance of the system can not be guaranteed with the traditional dynamic configuration of TDD subframes.

SUMMARY OF THE INVENTION

Embodiments of the invention provide a base station, a method of configuring TDD uplink-downlink subframes for base stations and a network apparatus for indicating a TDD uplink-downlink subframe configuration so as to address the problem of significant interference across time slots in adjacent cells due to flexible configuration of TDD subframes.

An embodiment of the invention provides a method of configuring TDD uplink-downlink subframes for base stations, the method including:

determining a coupling loss between every two of the base stations in a preset region;

clustering the base stations in the preset region according to the coupling loss between every two of the base stations; and the base stations configuring TDD uplink-downlink subframes according to results of clustering, wherein the base stations in the same cluster are configured with the same TDD uplink-downlink subframe configuration, and the base stations in different clusters are configured with the same TDD uplink-downlink subframe configuration or different TDD uplink-downlink subframe configurations.

An embodiment of the invention further provides a base station for configuring TDD uplink-downlink subframes, the base station including:

a loss determining unit configured to determine a coupling loss between every two of base stations in a preset region;

a clustering unit configured to cluster the base stations in the preset region according to the coupling loss between every two of the base stations;

a cluster indicating unit configured to transmit indication information including results of clustering to each of other base stations than the base station; and a subframe configuring unit configured to configure TDD uplink-downlink subframes according to the results of clustering, wherein the base stations in the same cluster are configured with the same TDD uplink-downlink subframe configuration, and the base stations in different clusters are configured with the same TDD uplink-downlink subframe configuration or different TDD uplink-downlink subframe configurations.

An embodiment of the invention further provides a base station for configuring TDD uplink-downlink subframes, the base station including:

a loss determining unit configured to determine a coupling loss between the current base station and each of other base stations in a preset region;

a clustering unit configured to cluster the current base station according to the coupling loss between the current base station and each of other base station; and a subframe configuring unit configured to configure TDD uplink-downlink subframes according to results of clustering, wherein base stations in the same cluster are configured with the same TDD uplink-downlink subframe configuration, and base stations in different clusters are configured with the same TDD uplink-downlink subframe configuration or different TDD uplink-downlink subframe configurations.

An embodiment of the invention further provides a network apparatus for indicating a TDD uplink-downlink subframe configuration, the network apparatus including:

a loss determining unit configured to determine a coupling loss between every two of base stations in a preset region;

a clustering unit configured to cluster the base stations in the preset region according to the coupling loss between every two of the base stations; and a cluster indicating unit configured to transmit indication information including results of clustering to each of the base stations so that the base stations configure TDD uplink-downlink subframes according to the results of clustering, where the base stations in the same cluster are configured with the same TDD uplink-downlink subframe configuration, and the base stations in different clusters are configured with the same TDD uplink-downlink subframe configuration or different TDD uplink-downlink subframe configurations.

An embodiment of the invention further provides a base station for configuring TDD uplink-downlink subframes, the base station including:

a loss transmitting unit configured to determine coupling losses between the base station itself and respective other base stations in a preset region and to transmit the determined coupling losses to a specified device; or to transmit Reference Signal Received Power (RSPR) of the respective other base stations measured by the current base station to the specified device; or to transmit reference signal transmitted power of the current base station and RSRP of the respective other base stations measured by the current base station to the specified device;

a result receiving unit configured to receive an indication information, including results of clustering, transmitted by the specified device; and a subframe configuring unit configured to configure TDD uplink-downlink subframes according to the results of clustering, wherein base stations in the same cluster are configured with the same TDD uplink-downlink subframe configuration, and base stations in different clusters are configured with the same TDD uplink-downlink subframe configuration or different TDD uplink-downlink subframe configurations.

The base station, the method of configuring TDD uplink-downlink subframes for base stations according to the embodiments of the invention and the network apparatus for indicating a TDD uplink-downlink subframe configuration have the following advantageous effects: base stations are clustered by measuring coupling losses between the base station nodes, and dynamic TDD subframe configurations between the respective base station nodes are adjusted and restricted according to results of clustering for the purpose of lowering interference across time slots due to flexible configuration of TDD subframes and optimizing the performance of the system.

DETAILED DESCRIPTION OF THE EMBODIMENTS

A base station and a method of configuring TDD uplink-downlink subframes according to the invention will be described below in further details with reference to the drawings and embodiments thereof.

The TDD mode which is one of two general duplex systems has gained increasing attention in the context of an increasingly growing bandwidth demand of broadband mobile communication. Uplink/downlink signals are transmitted in different subframes over the same frequency resources in the uplink and the downlink in the TDD system. In common TDD systems including a 3G Time Division-Synchronous Code Division Multiple Access (TD-SCDMA) system and a 4G TD-LTE system, uplink-downlink subframes are allocated statically or semi-statically, and a common practice is to plan a network by determining the proportion of uplink to downlink subframes according to the type of a cell and a rough proportion of traffic and keeping the proportion unchanged. This is a simple but working practice in the context of large coverage by a macro cell. However an increasing number of low-power base stations including a pico cell, a home node B, etc., have been deployed for small local coverage along with the advancement of technologies, and there are a small number of users and a significantly varying traffic demand of the users in these cells, thus resulting in a dynamically varying proportion of uplink to downlink traffic as needed in the cells. Although an online change to the proportion of uplink to downlink subframes of a cell has been also supported in the TD-LTE standard, for example, a complicated signaling flow and a configuration period are required, thus degrading the performance of the system and also failing to track a real-time change in traffic.

In view of this, some more solutions to dynamic configuration of TDD uplink and downlink subframes have gained attention, but an application of these solutions has been discouraged by serious interference across time slots between adjacent cells, including interference between adjacent cells at the same frequency and interference between adjacent cells at adjacent frequencies, and a failure to address such interference may result in a loss of the benefit of dynamic configuration of the uplink-downlink proportion and even the breakdown throughout the network.

Figure 1:
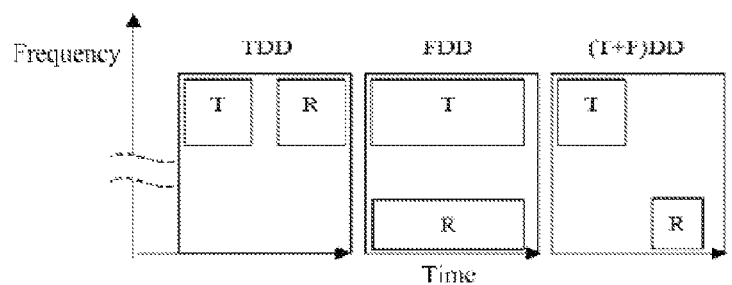
FIG. 1 is a schematic diagram of a time-frequency relationship in the basic duplexing schemes.
Figure 2:
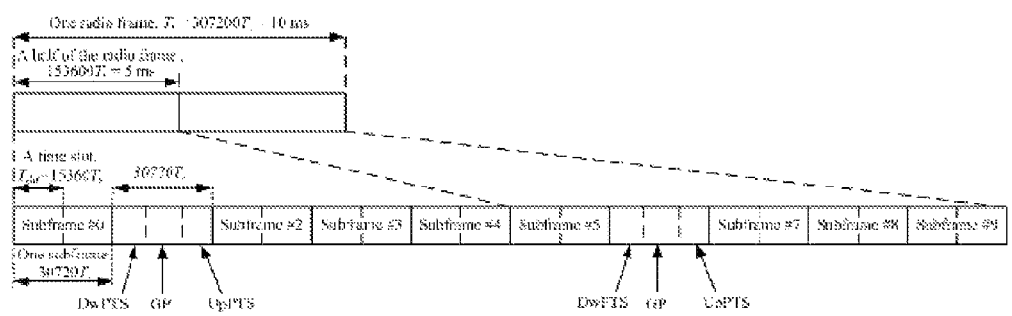
FIG. 2 is a schematic structural diagram of a frame in the TD-LTE system.
Figure 3:
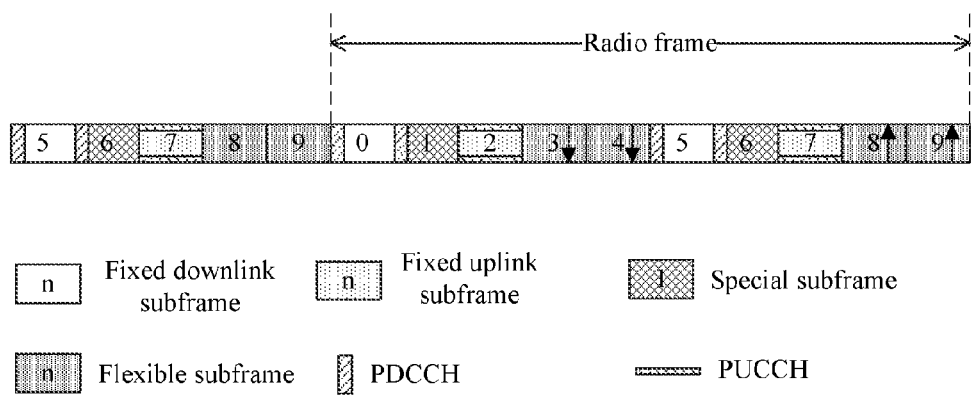
FIG. 3 is a schematic diagram of the solution to dynamic allocation of uplink-downlink subframes.
Figure 4:
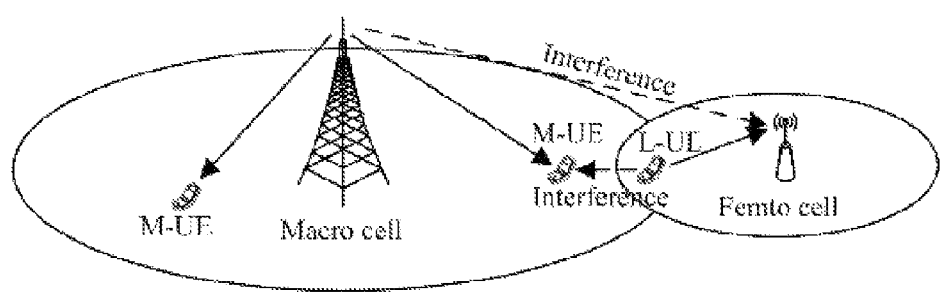
FIG. 4 is a schematic diagram of TDD interference across time slots.
Figure 5:
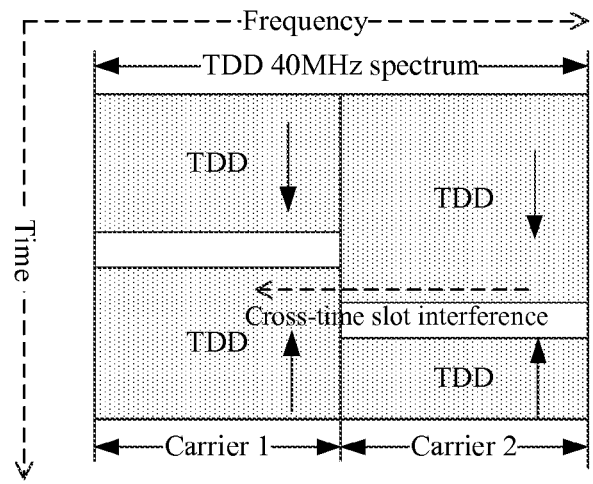
FIG. 5 is a schematic diagram of different uplink-downlink configurations over adjacent TDD carriers.
Figure 6:
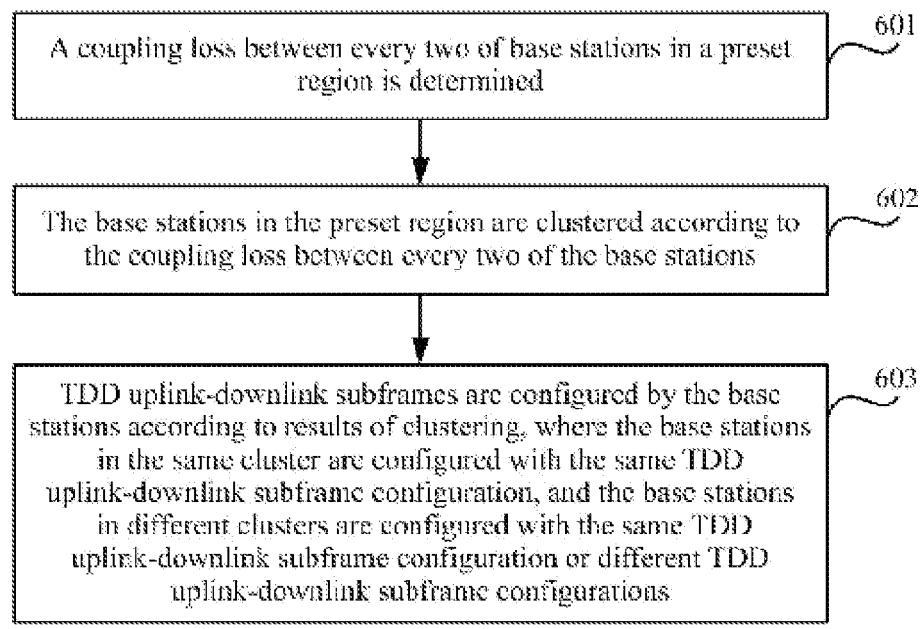
FIG. 6 is a flow chart of a method of configuring TDD uplink-downlink subframes according to an embodiment of the invention.

In order to address the problem of interference across time slots due to dynamic configuration of TDD uplink and downlink subframes, an embodiment of the invention provides a method of configuring TDD uplink and downlink subframes for base stations, as illustrated in FIG. 6, the method including the following steps:

In step 601, a coupling loss between every two of the base stations in a preset region is determined.

The preset region is a predetermined region of a TDD network in a range which can be selected particularly as needed, where the range of the region of the TDD network decides those base stations to be restricted in term of an uplink-downlink subframe configuration.

The coupling loss between every two of the base stations in the preset region can be determined by an upper node of all the base stations or a specified base station or any base station in the preset region, or the coupling loss between every two of the base stations in the preset region can be determined in coordination by all the base stations in the preset region.

The coupling loss can be determined in a measurement mechanism, interface signaling, etc., between every two base stations.

In the embodiment of the invention, the coupling losses of all the base stations in the preset region are counted, so base stations between which a coupling loss can be determined may be base stations at the same level in the network, e.g., two macro base stations in macro cells (e.g., macro eNBs), two pico base stations in pico cells (e.g., pico eNBs) or two home eNBs in femto cells, or can be base stations at different levels in the network, e.g., a macro eNB and a pico eNB, a macro eNB and a home eNB, a pico eNB and a home eNB, etc.

In step 602, the base stations in the preset region are clustered according to the coupling loss between every two of the base stations.

All the base stations in the preset region can be clustered by the upper node of all the base stations or the specified base station or any base station in the preset region, or all the base stations in the preset region can be clustered in coordination by all the base stations in the preset region.

In step 603, TDD uplink-downlink subframes are configured by the base station according to results of clustering, where the base stations in the same cluster are configured with the same TDD uplink-downlink subframe configuration, and base stations in different clusters are configured with the same TDD uplink-downlink subframe configuration or different TDD uplink-downlink subframe configurations.

In the embodiment of the invention, the base stations are clustered according to the coupling loss by classifying base stations above a predetermined interference threshold into the same cluster, base stations in the same cluster are configured with the same TDD uplink-downlink subframe configuration to thereby avoid interference across time slots.

The step 601 and the step 602 are performed by the upper node of all the base stations or the specified base station or any base station in the preset region in a centralized management scheme, or the step 601 and the step 602 are performed in coordination by all the base stations in the preset region in a distributed management scheme.

Preferred embodiments of the invention in the centralized management scheme and the distributed management scheme will be described below.

First Embodiment

The present embodiment relates to the centralized management scheme, and particularly the step 601 and the step 602 are performed by the upper node of all the base stations, where the upper node transmits indication information including the results of clustering to each base station so that the respective base stations in the preset region configure TDD uplink-downlink subframes according to the results of clustering, where base stations in the same cluster are configured with the same TDD uplink-downlink subframe configuration, and base stations in different clusters are configured with the same TDD uplink-downlink subframe configuration or different TDD uplink-downlink subframe configurations.

Preferably in the step 602, the upper node clusters the base stations in the preset region according to the coupling loss between every two of the base stations particularly as follows:

For each base station, the base station is classified into a cluster, and it is judged whether to classify each of other base stations than the base station in the preset region into the cluster to which the base station belongs according to the coupling loss between the base station and each of other base station; and Clusters, including at least two base stations and having at least one common base station, are combined into the same cluster, and clusters including only one base station and clusters, including at least two base stations and having no base station in common with any other cluster are maintained, to obtain the results of clustering.

Initially each base station is classified alone into a cluster, and then the following clustering process is performed on each base station: it is judged whether to classify the other base stations into the cluster to which the current base station belongs. After the clustering process is performed on the current base station, a result of the process for the cluster to which the current base station belongs relates to the following two scenarios:

Firstly none of the other base stations is classified into the cluster to which the current base station belongs, that is, the cluster to which the current base station belongs includes only the current base station itself and will be referred to as a single-element cluster in the present embodiment; and Secondly at least one of the other base stations is classified into the cluster to which the current base station belongs, that is, the cluster to which the current base station belongs includes at least two base stations and will be referred to as a non-single-element cluster in the present embodiment.

Clusters, including at least two base stations and having at least one common base station, are combined into the same cluster, and clusters including only one base station and clusters, including at least two base stations and having no base station in common with any other cluster are maintained, to thereby obtain the results of clustering; and After the clustering process is performed on the cluster to which each base station belongs, all of intersecting sets of base stations are classified into the same cluster by taking a propagation effect between base station nodes into account for those non-single-element clusters.

In the embodiment of the invention, base stations with a propagation effect are classified into the same cluster, and dynamic TDD subframes configurations between the respective base station nodes are adjusted and restricted according to the results of clustering, thereby avoiding interference across time slots due to different TDD uplink-downlink subframe configurations in adjacent cells susceptible to infection for the purpose of lowering interference across time slots due to flexible configuration of TDD subframes and optimizing the performance of the system.

Preferably in the step 601, the upper node determines the coupling loss between every two of the base stations in the preset region particularly as follows:

The coupling loss between every two of the base stations in the preset region is determined from the coupling loss between each base station and each of other base station.

Preferably the coupling loss between each base station and each of other base stations is determined in any of the following schemes:

Firstly the coupling loss is derived based upon Reference Signal Received Power (RSRP).

Preferably for each base station, RSRP of each of other base stations measured by the current base station (i.e., the present base station) is compared with a preset threshold, and the coupling loss between each base station and each of other base stations is determined.

Particularly different preset thresholds are preset for different types of base stations, and the coupling loss between the two base stations is determined as the difference between the corresponding preset thresholds and the RSRP.

Alternatively the coupling loss between each base station and each of other base stations is determined is determined according to Reference Signal Received Power (RSRP) of each of other base stations and RSPR of each of other base stations measured by the current base station.

Particularly each base station can determine coupling loss between the present base station and each of other base stations in the preset region as described above and report it to the upper node the, or each base station can report its measured RSRP of each of other base stations to the upper node, or each base station can report its reference signal transmitted power and RSRP of each of other base stations measured by the current base station to the upper node, and the upper node can determine the coupling loss between each base station and each of other base stations than the present base station in the preset region as described above.

Secondly the coupling loss is determined by measuring between every two base station nodes.

The coupling loss between the current base station and each of other base stations is determined based upon measurement parameters, for calculation of a coupling loss, measured by the two base stations.

Particularly the following measurement parameters for calculation of a coupling loss can be measured by measuring between every two base station nodes: a path loss, shadow fading and an antenna gain, and when the two base stations are located in cells at the same frequency, the measure parameters can further include attenuation across adjacent frequencies, all of which can be measured particularly in an existing measurement mechanism, and the invention will not be limited to any particular mechanism.

Figure 7:
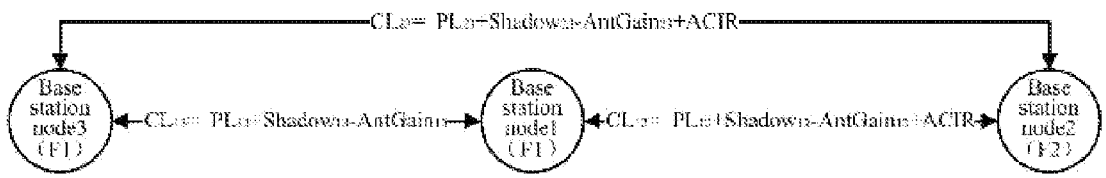
FIG. 7 is a schematic diagram of a coupling loss calculated for same-frequency and different-frequency network deployments according to an embodiment of the invention.

Preferably, as illustrated in FIG. 7, when the two base stations are deployed in the network at the same frequency, the coupling loss between the two base stations is determined based upon the measurement parameters, for calculation of a coupling loss, measured by the two base stations as path losses of the two base stations+shadow fading of the two base stations−antenna gains of the two base stations; and When the two base stations are deployed in the network at different frequencies, the coupling loss between the two base stations is determined based upon the measurement parameters, for calculation of a coupling loss, measured by the two base stations as path losses of the two base stations+shadow fading of the two base stations−antenna gains of the two base stations+attenuation across adjacent frequencies ACIR of the two base stations.

The coupling loss can be calculated using the measurement parameters as described above without any limitation thereto, for example, shadow fading may be omitted in some scenario.

In the second scheme, preferably the respective base stations determine the coupling losses in the measurement mechanism above and report them to the upper node.

Thirdly the coupling loss is determined by simulation in advance.

The coupling loss, between the base station itself and each of other base stations in the preset region, determined in advance by simulating the measurement parameters, for calculation of a coupling loss, measured between the two base stations using network planning software is retrieved directly. Simulation using the network planning software can be performed on another device or can be performed on the upper node, particularly by simulating a test scenario of every two base stations to derive the measurement parameters.

Preferably in the present embodiment, the clustering upper node determines whether to classify each of other base stations into the cluster to which the current base station belongs particularly as follows:

The coupling loss between the current base station and each of other base stations in the preset region is compared respectively with a preset threshold; and When the coupling loss between the current base station and one of the other base stations is not above the preset threshold, then the other base station is classified into the cluster to which the current base station belongs; otherwise, the other base station is not classified into the cluster to which the current base station belongs.

If the coupling loss is not above the preset threshold, then it indicates that for the current base station, there is a base station in an adjacent cell at a short distance thereto and with a significant threat of interference thereto, and the current base station node and the base station in the adjacent cell at a short distance thereto are classified into the same cluster.

If the coupling loss between the current base station and each of other base stations is above the preset threshold, then it is determined that for the current base station, there is no base station in an adjacent cell at a short distance thereto and with a significant threat of interference thereto, and the cluster to which the current base station belongs includes only the current base station and is a single-element cluster.

The preset threshold can be preset by presetting a single preset threshold for all the base stations or presetting different preset thresholds dependent upon cell types of the base stations, the spacing between the addresses of the base stations, the types of base stations, deployment schemes of the base stations, etc.

Preferably in the present embodiment, different preset thresholds are preset for different combinations of types of base stations, for example, different preset thresholds are preset respectively for a macro base station and a macro base station, a pico base station and a pico base station, a home base station and a home base station, a macro base station and a pico base station, a macro base station and a home base station, and a pico base station and a home base station, and then the coupling threshold between the two base stations is compared with the preset threshold, particularly as follows:

A preset threshold corresponding to the combination of types to which the types of the two base stations belong is determined, and the coupling loss between the two base stations is compared with the corresponding preset threshold.

Preferably the preset threshold is preset according to an empirical value of coupling loss corresponding to a different extent of interference between the base stations, for example, such a coupling loss is determined empirically that there is typically a significant threat of interference between the base stations.

Preferably the preset threshold in the present embodiment is derived as follows:

A preset threshold is initially preset, and a transmission condition where the base stations in the preset region are clustered at the current preset threshold is simulated; and The preset threshold is adjusted according to a result of simulation and derived until the simulated transmission condition where the base stations are clustered at the adjusted preset threshold satisfies a preset condition.

The results of clustering above are obtained at the current preset threshold, and in order to judge whether the preset threshold has been preset reasonably, that is, when interference across time slots can be avoided effectively, in the present embodiment, a data transmission scenario where the base stations in the preset region configure TDD uplink-downlink subframes according to the results of clustering is simulated, and the extent of interference across time slots is determined according to a result of simulation, and if the extent of interference is insignificant, then it indicates that the preset threshold has been preset reasonably; otherwise, the preset threshold is adjusted and further simulation is performed.

Preferably the data transmission scenario where the respective base stations configure TDD uplink-downlink subframes according to the results of clustering can alternatively be tested in reality and the preset threshold can be preset according to a result of test if this is allowed.

Preferably in the present embodiment, the respective base stations receiving the indication information including the results of clustering configure TDD uplink-downlink subframes according to the results of clustering particularly as follows:

1) The cluster where each base station resides is determined;

2) When the cluster where the base station resides includes only the base station itself, then the base station can configure TDD uplink-downlink subframes of the base station without being restricted by TDD uplink-downlink subframes configured by the other base stations in the preset region.

If the cluster where the base station resides is a single-element cluster, then it indicates that for the base station, there is no a base station at a short distance thereto and with a significant threshold of interference thereto, so TDD uplink-downlink subframes can be configured flexibly at will in compliance with the specification of the standard without being restricted by TDD uplink-downlink subframes configured by the other base stations in the preset region.

3) When the cluster where the base station resides includes at least two base stations, the same TDD uplink-downlink subframe configuration as the other base station(s) in the cluster are configured.

If the cluster where the base station resides includes at least two base stations, then it indicates that for the base station, there is a base station resides at a short distance thereto and with a significant threshold of interference thereto, and the same TDD uplink-downlink subframe configuration as the other base station(s) in the cluster are configured. All the base stations in the cluster can be configured with the same TDD uplink-downlink subframe configuration in a particular scheme without any limitation thereto, for example, can be initiated by any one of the base stations or negotiated together about or determined by the coordinating upper node or the like.

Figure 8:
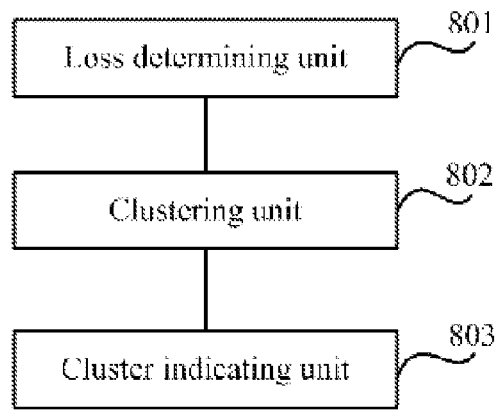
FIG. 8 is a schematic structural diagram of a network apparatus for indicating a TDD uplink-downlink subframe configuration according to a first embodiment of the invention.

The present embodiment further provides a network apparatus functioning as an upper node, as illustrated in FIG. 8, the network apparatus including:

A loss determining unit 801, configured to determine a coupling loss between every two of base stations in a preset region;

A clustering unit 802, configured to cluster the base stations in the preset region according to the coupling loss between every two of the base stations; and A cluster indicating unit 803, configured to transmit indication information including results of clustering to each of the base stations so that each of the base stations configures TDD uplink-downlink subframes according to the results of clustering, where the base stations in the same cluster are configured with the same TDD uplink-downlink subframe configuration, and the base stations in different clusters are configured with the same TDD uplink-downlink subframe configuration or different TDD uplink-downlink subframe configurations.

Preferably the clustering unit 802 configured to cluster the base stations in the preset region according to the coupling loss between every two of the base stations is further configured:

For each base station, to classify the base station into a cluster and to judge whether to classify each of other base stations than the base station in the preset region into the cluster to which the base station belongs according to the coupling loss between the base station and each of other base station; and To combine clusters, including at least two base stations and having at least one common base station, into the same cluster, and maintain clusters including only one base station and clusters, including at least two base stations and having no base station in common with any other cluster, to thereby obtain the results of clustering.

Preferably the loss determining unit 801 configured to determine the coupling loss between every two of the base stations in the preset region is further configured:

To determine the coupling loss between every two of the base stations in the preset region according to the coupling loss between each base station and each of other base station.

Preferably the loss determining unit 801 is further configured to receive the coupling loss, reported by each base station, between the current base station and each of other base stations or to determine the coupling loss between each base station and each of other base stations by any one of:

Determining the coupling loss between the current base station and each of other base stations according to reference signal transmitted power of each of other base stations and Reference Signal Received Power (RSRP) of each of other base stations measured by the current base station; or Determining the coupling loss between the current base station and each of other base stations by comparing RSRP of each of other base stations measured by the current base station with a preset threshold and; or Retrieving directly the coupling loss, between the base station itself and each of other base stations in the preset region, determined in advance by simulating measurement parameters, for calculation of a coupling loss, measured between the two base stations using network planning software.

Preferably the cluster indicating unit 803 configured to transmit indication information including results of clustering to each of the base stations is further configured:

To transmit information about all the clusters as the results of clustering and the base stations in the clusters to each of the base stations; or To transmit information about all the base stations in the cluster where each of the base stations resides respectively to each of the base stations.

Preferably the clustering unit 802 configured, for each base station, to judge whether to classify each of other base stations into the cluster to which the base station belongs is further configured:

To compare the coupling loss between the base station and each of other base stations in the preset region respectively with a preset threshold; and When the coupling loss between the current base station and one of the other base stations is not above the preset threshold, to classify the other base station into the cluster to which the current base station belongs; otherwise, not to classify the other base station into the cluster to which the current base station belongs.

Preferably different preset thresholds are preset for different combinations of types of base stations, and the clustering unit 802 configured to compare the coupling loss between the two base stations with the preset threshold is further configured:

To determine a preset threshold corresponding to the combination of types to which the types of the two base stations belong and to compare the coupling loss between the two base stations with the corresponding preset threshold.

Preferably the preset threshold used by the clustering unit 802 is derived by any one of:

Presetting the preset threshold according to an empirical value of coupling loss corresponding to a different extent of interference between the base stations; or Testing a data transmission scenario where the respective base stations configure TDD uplink-downlink subframes according to the results of clustering and presetting the preset threshold according to a result of test; or Initially presetting a preset threshold and simulating a transmission condition where the base stations in the preset region are clustered at the current preset threshold, and Adjusting the preset threshold according to a result of simulation and deriving the preset threshold until the simulated transmission condition where the base stations are clustered at the adjusted preset threshold satisfies a preset condition.

Figure 9:
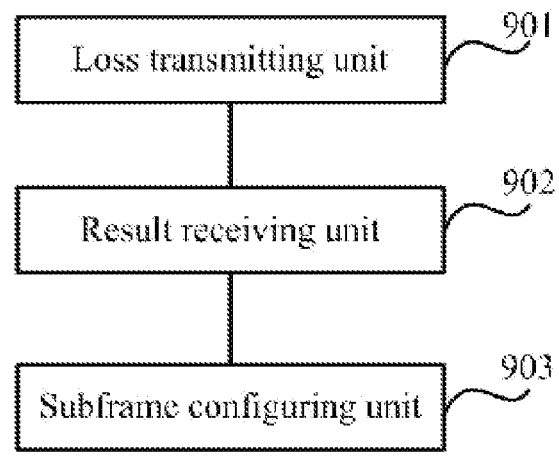
FIG. 9 is a schematic structural diagram of a base station for configuring TDD uplink-downlink subframes according to the first embodiment of the invention.

The present embodiment further provides a base station for configuring TDD uplink-downlink subframes, as illustrated in FIG. 9, the base station including:

A loss transmitting unit 901, configured to determine coupling losses between the base station itself and respective other base stations in a preset region and to transmit the determined coupling losses to a specified device; or to transmit Reference Signal Received Power (RSPR) of the respective other base stations measured by the current base station to the specified device; or to transmit reference signal transmitted power of the current base station and RSRP of the respective other base stations measured by the current base station to the specified device;

A result receiving unit 902, configured to receive an indication information, including results of clustering, transmitted by the specified device; and A subframe configuring unit 903, configured to configure TDD uplink-downlink subframes according to the results of clustering, where base stations in the same cluster are configured with the same TDD uplink-downlink subframe configuration, and base stations in different clusters are configured with the same TDD uplink-downlink subframe configuration or different TDD uplink-downlink subframe configurations.

In the present embodiment, the specified device is a network apparatus.

Preferably the subframe configuring unit 903 configured to configure TDD uplink-downlink subframes according to the results of clustering is further configured:

To determine the cluster where the base station itself resides according to the results of clustering; and When the cluster where the base station itself resides includes only the base station itself, to configure TDD uplink-downlink subframes of the base station without being restricted by TDD uplink-downlink subframes configured by the other base stations in the preset region; or When the cluster where the base station itself resides includes at least two base stations, to configure the same TDD uplink-downlink subframe configuration as the other base station(s) in the cluster.

Preferably the loss transmitting unit 901 is further configured to determine the coupling loss between the base station itself and each of other base stations in the preset region by any one of:

Determining the coupling loss between the current base station and each of other base stations according to reference signal transmitted power of each of other base stations and Reference Signal Received Power (RSRP) of each of other base stations measured by the current base station; or Determining the coupling loss between the current base station and each of other base stations by comparing RSRP of each of other base stations measured by the current base station with a preset threshold and; or Determining the coupling loss between the current base station and each of other base stations based upon measurement parameters, for calculation of a coupling loss, measured by the two base stations; or Retrieving directly the coupling loss, between the base station itself and each of other base stations in the preset region, determined in advance by simulating measurement parameters, for calculation of a coupling loss, measured between the two base stations using network planning software.

Preferably the upper node can be an RNC or of course can alternatively be another upper central node.

Clustering can be performed by the upper node or the specified base station in the centralized management scheme to thereby alleviate a processing burden on the base station as a whole and save networking signaling.

Second Embodiment

The present embodiment relates to the centralized management scheme, and particularly the step 601 and the step 602 are performed by the specified base station or any base station in the preset region, and furthermore the specified base station or any base station transmits indication information including the results of clustering to the respective other base stations than the specified base station or any base station in the preset region so that the other base stations in the preset region configure TDD uplink-downlink subframes according to the results of clustering, where base stations in the same cluster are configured with the same TDD uplink-downlink subframe configuration, and base stations in different clusters are configured with the same TDD uplink-downlink subframe configuration or different TDD uplink-downlink subframe configurations. And the specified base station or any base station configures TDD uplink-downlink subframes according to its obtained results of clustering so that the respective base stations in the preset region configure TDD uplink-downlink subframes according to the results of clustering.

In the present embodiment, in the step 601, the specified base station or any base station determines the coupling loss between every two of the base stations in the preset region particularly as follows;

The coupling loss between every two of the base stations in the preset region is determined according to the coupling loss between each base station and each of other base station.

Particularly the coupling loss between each base station and each of other base stations can be determined in any of the schemes provided in the first embodiment.

Unlikely, in order to determine the coupling loss between each base station and each of other base station, the specified base station or any base station determines the coupling loss between the specified base station or any base station and each of other base stations than the specified base station or any base station in one of the schemes provided in the first embodiment.

Moreover each of other base stations than the specified base station or any base station determines the coupling loss between the current base station (i.e., the present base station) and each of other base stations (i.e., each of other base stations than the present base station in the preset region) in one of the schemes above and reports the coupling loss to the specified base station or any base station.

Alternatively each of other base stations than the specified base station or any base station reports RSRP measured by the current base station to the specified base station or any base station, which determines the coupling loss between each of other base stations than the specified base station or any base station and each of other base stations than the current base station in one of the schemes above.

Alternatively each of other base stations than the specified base station or any base station reports its reference signal transmitted power and RSRP of each of other base stations measured by the current base station to the specified base station or any base station, which determines the coupling loss between each of other base stations than the specified base station or any base station and each of other base stations than the current base station in one of the schemes above.

Preferably the specified base station or any base station can transmit the indication information including the results of clustering to each of other base stations than the base station itself in any of the following schemes:

1) The specified base station or any base station transmits information about all the clusters as the results of clustering and the base stations in the clusters to each of other base stations than the specified base station or any base station;

Stated otherwise, the indication information which is the results of clustering of all the base stations includes information about the clusters where the respective base stations reside and the base stations in the clusters, and the specified base station or any base station transmits all the obtained results of clustering to each of other base stations without processing the results of clustering so that the other base stations determine their results clustering, that is, determine information about the clusters where they reside and the base stations in the clusters, according to all the received results of clustering to thereby configure corresponding uplink-downlink subframes.

2) The specified base station or any base station transmit information about all the base stations in the cluster where each of other base stations than the base station itself resides respectively to each of other base station.

The indication information can include only the results of clustering of the receiving base station, i.e., the information about the base stations in the cluster where the receiving base station resides, to thereby alleviate processing burdens on the other base stations and lower the amount of resources used for transmission.

Preferably in the present embodiment, reference can be made to the description of the first embodiment for the clustering process performed by the specified base station in the step 602, so a repeated description thereof will be omitted here.

Preferably reference can be made to the description of the first embodiment for configuring TDD uplink-downlink subframes by the specified base station or any base station according to its obtained results of clustering and by the other base stations according to the received results of clustering, so a repeated description thereof will be omitted here.

The present embodiment further provides a centrally managing base station and managed base station.

Figure 10:
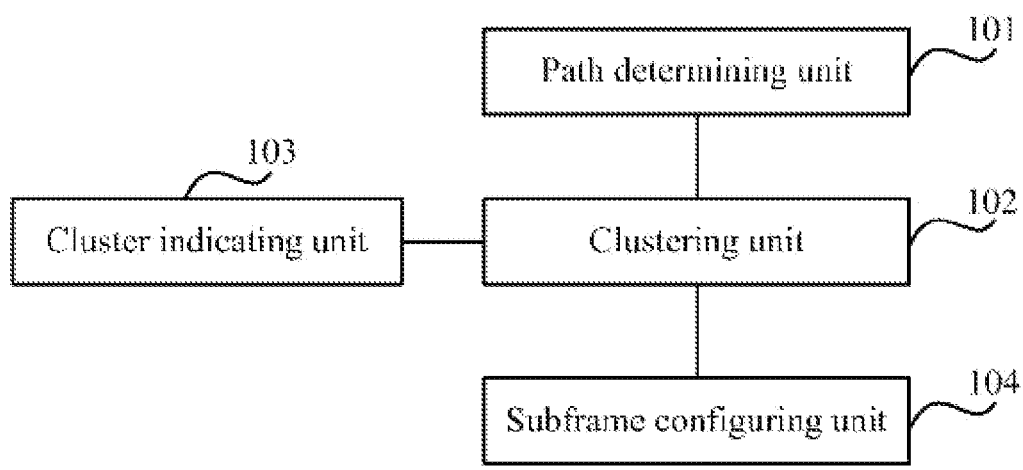
FIG. 10 is a schematic structural diagram of a centrally managing base station for configuring TDD uplink-downlink subframes according to a second embodiment of the invention.

As illustrated in FIG. 10, a centrally managing base station for configuring TDD uplink-downlink subframes according to an embodiment of the invention includes:

A loss determining unit 101 is configured to determine a coupling loss between every two of base stations in a preset region;

A clustering unit 102 is configured to cluster the base stations in the preset region according to the coupling loss between every two of the base stations;

A cluster indicating unit 103 is configured to transmit indication information including results of clustering to each of other base stations than the base station itself; and A subframe configuring unit 104 is configured to configure TDD uplink-downlink subframes according to the results of clustering, where base stations in the same cluster are configured with the same TDD uplink-downlink subframe configuration, and base stations in different clusters are configured with the same TDD uplink-downlink subframe configuration or different TDD uplink-downlink subframe configurations.

Preferably the clustering unit 102 configured to cluster the base stations in the preset region according to the coupling loss between every two of the base stations is further configured:

For each base station, to classify the base station into a cluster and to judge whether to classify each of other base stations than the base station in the preset region into the cluster to which the base station belongs according to the coupling loss between the base station and each of other base station; and To combine clusters, including at least two base stations and having at least one common base station, into the same cluster, and maintain clusters including only one base station and clusters, including at least two base stations and having no base station in common with any other cluster, to thereby obtain the results of clustering.

Preferably the loss determining unit 101 configured to determine the coupling loss between every two of the base stations in the preset region is further configured:

To determine the coupling loss between every two of the base stations in the preset region according to the coupling loss between each base station and each of other base station.

Preferably the loss determining unit 101 configured to determine the coupling loss between each base station and each of other base stations is further configured:

To determine the coupling loss between the current base station and each of other base stations according to reference signal transmitted power of each of other base stations and Reference Signal Received Power (RSRP) of each of other base stations measured by the current base station; or To determine the coupling loss between the current base station and each of other base stations by comparing RSRP of each of other base stations measured by the current base station with a preset threshold and; or To retrieve directly the coupling loss, between the base station itself and each of other base stations in the preset region, determined in advance by simulating measurement parameters, for calculation of a coupling loss, measured between the two base stations using network planning software.

Preferably the loss determining unit 101 is further configured to determine the coupling loss between the current base station and each of other base stations by any one of the following operations and to receive the coupling loss, reported by each of other base stations than the current base station, between each of other base stations than the current base station and each of other base stations than the reporting base station:

Determining the coupling loss between the current base station and each of other base stations according to reference signal transmitted power of each of other base stations and Reference Signal Received Power (RSRP) of each of other base stations measured by the current base station; or Determining the coupling loss between the current base station and each of other base stations by comparing RSRP of each of other base stations measured by the current base station with a preset threshold and; or Determining the coupling loss between the current base station and each of other base stations based upon measurement parameters, for calculation of a coupling loss, measured by the two base stations; or Retrieving directly the coupling loss, between the base station itself and each of other base stations in the preset region, determined in advance by simulating measurement parameters, for calculation of a coupling loss, measured between the two base stations using network planning software.

Preferably the cluster indicating unit 103 is further configured to transmit information about all the clusters and all the base stations in the clusters directly to each of other base stations than the current base station; or to transmit information about all the base stations in the cluster where each of other base stations than the current base station resides respectively to each of other base station.

Preferably the subframe configuring unit 104 configured to configure TDD uplink-downlink subframes according to the results of clustering is further configured:

To determine the cluster where the base station itself resides; and

When the cluster where the base station itself resides includes only the base station itself, to configure TDD uplink-downlink subframes of the base station without being restricted by TDD uplink-downlink subframes configured by the other base stations in the preset region; or When the cluster where the base station itself resides includes at least two base stations, to configure the same TDD uplink-downlink subframe configuration as the other base station(s) in the cluster.

Preferably the clustering unit 102 configured, for each base station, to judge whether to classify each of other base stations into the cluster to which the base station belongs is further configured:

To compare the coupling loss between the base station and each of other base stations in the preset region respectively with a preset threshold; and When the coupling loss between the current base station and one of the other base stations is not above the preset threshold, to classify the other base station into the cluster to which the current base station belongs; otherwise, not to classify the other base station into the cluster to which the current base station belongs.

Preferably different preset thresholds are preset for different combinations of types of base stations, and the clustering unit 902 configured to compare the coupling loss between the two base stations with the preset threshold is further configured:

To determine a preset threshold corresponding to the combination of types to which the types of the two base stations belong and to compare the coupling loss between the two base stations with the corresponding preset threshold.

The preset threshold used by the clustering unit 902 is derived by any one of:

Presetting the preset threshold according to an empirical value of coupling loss corresponding to a different extent of interference between the base stations; or Testing a data transmission scenario where the respective base stations configure TDD uplink-downlink subframes according to the results of clustering and presetting the preset threshold according to a result of test; or Initially presetting a preset threshold and simulating a transmission condition where the base stations in the preset region are clustered at the current preset threshold, and Adjusting the preset threshold according to a result of simulation and deriving the preset threshold until the simulated transmission condition where the base stations are clustered at the adjusted preset threshold satisfies a preset condition.

A particular structure of the centrally managed base station according to the present embodiment is the same as the structure of the base station according to the first embodiment, so a repeated description thereof will be omitted here.

Third Embodiment

The present embodiment relates to the distributed management scheme, and particularly the step 601 and the step 602 are performed in coordination by all the base stations, where for any base station in the preset region, particularly the base station determines the coupling loss between the current base station and each of other base stations and clusters the current base station according to the coupling loss between the current base station and each of other base stations as follows: the current base station is classified into a cluster, and it is judged whether to classify each of other base stations into the cluster where the current base station belongs, according to the coupling loss between the current base station and each of other base station, as a result of clustering of the current base station; and TDD uplink-downlink subframes are configured according to the results of clustering obtained by the current base station.

Preferably for any base station, the coupling loss between the current base station (the present base station) and each of other base stations can be determined by any one of:

Determining the coupling loss between the current base station and each of other base stations according to reference signal transmitted power of each of other base stations and Reference Signal Received Power (RSRP) of each of other base stations measured by the current base station; or Determining the coupling loss between the current base station and each of other base stations by comparing RSRP of each of other base stations measured by the current base station with a preset threshold and; or Determining the coupling loss between the current base station and each of other base stations based upon measurement parameters, for calculation of a coupling loss, measured by the two base stations; or Retrieving directly the coupling loss, between the base station itself and each of other base stations in the preset region, determined in advance by simulating measurement parameters, for calculation of a coupling loss, measured between the two base stations using network planning software.

Preferably reference can be made to the description of the first embodiment for the process of configuring TDD uplink-downlink subframes by any base station according to the results of clustering, so a repeated description thereof will be omitted here.

With the method according to the embodiment of the invention, any base station can obtain its results of clustering without reporting any coupling loss or coupling-related parameter and adjust and restrict dynamic configuration of TDD subframes between the base station nodes as appropriate according to the results of clustering to thereby avoid TDD subframe configurations from being applied between cells with a significant threat of interference so as to lower interference to uplink subframes in the adjacent cells.

Figure 11:
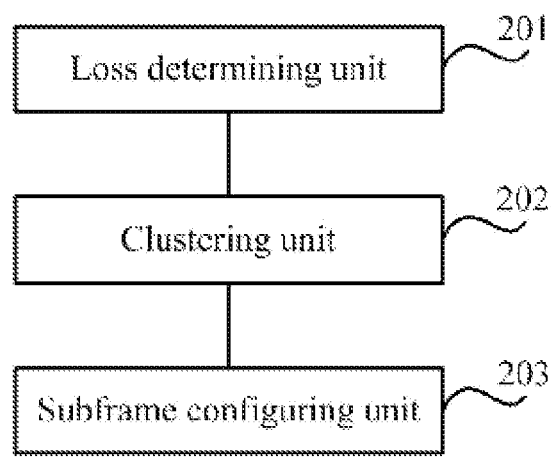
FIG. 11 is a schematic structural diagram of a base station for configuring TDD uplink-downlink subframes according to a third embodiment of the invention.

The present embodiment provides a base station for configuring TDD uplink-downlink subframes, as illustrated in FIG. 11, the base station including:

A loss determining unit 201, configured to determine a coupling loss between the current base station and each of other base station;

A clustering unit 202, configured to cluster the current base station according to the coupling loss between the current base station and each of other base station; and A subframe configuring unit 203, configured to configure TDD uplink-downlink subframes according to results of clustering, where base stations in the same cluster are configured with the same TDD uplink-downlink subframe configuration, and base stations in different clusters are configured with the same TDD uplink-downlink subframe configuration or different TDD uplink-downlink subframe configurations.

Preferably the clustering unit 202 configured to cluster the current base station is further configured:

To classify the current base station into a cluster and to judge whether to classify each of other base stations into the cluster to which the current base station belongs according to the coupling loss between the current base station and each of other base stations as the result of clustering of the current base station.

Preferably the loss determining unit 201 configured to determine the coupling loss between the current base station and each of other base stations is further configured:

To determine the coupling loss between the current base station and each of other base stations according to reference signal transmitted power of each of other base stations and Reference Signal Received Power (RSRP) of each of other base stations measured by the current base station; or To determine the coupling loss between the current base station and each of other base stations by comparing RSRP of each of other base stations measured by the current base station with a preset threshold and; or To determine the coupling loss between the current base station and each of other base stations based upon measurement parameters, for calculation of a coupling loss, measured by the two base stations; or To retrieve directly the coupling loss, between the base station itself and each of other base stations in the preset region, determined in advance by simulating measurement parameters, for calculation of a coupling loss, measured between the two base stations using network planning software.

Preferably the clustering unit 202 configured to judge whether to classify each of other base stations into the cluster to which the current base station belongs is further configured:

To compare the coupling loss between the current base station and each of other base stations in the preset region respectively with a preset threshold; and When the coupling loss between the current base station and one of the other base stations is not above the preset threshold, to classify the other base station into the cluster to which the current base station belongs; otherwise, not to classify the other base station into the cluster to which the current base station belongs.

Preferably different preset thresholds are preset for different combinations of types of base stations, and the clustering unit 102 configured to compare the coupling loss between the two base stations with the preset threshold is further configured:

To determine a preset threshold corresponding to the combination of types to which the types of the two base stations belong and to compare the coupling loss between the two base stations with the corresponding preset threshold.

The preset threshold used by the clustering unit 202 is derived by any one of:

Presetting the preset threshold according to an empirical value of coupling loss corresponding to a different extent of interference between the base stations; or Testing a data transmission scenario where the respective base stations configure TDD uplink-downlink subframes according to the results of clustering and presetting the preset threshold according to a result of test; or Initially presetting a preset threshold and simulating a transmission condition where the base stations in the preset region are clustered at the current preset threshold, and Adjusting the preset threshold according to a result of simulation and deriving the preset threshold until the simulated transmission condition where the base stations are clustered at the adjusted preset threshold satisfies a preset condition.

Preferably the subframe configuring unit 203 configured to configure TDD uplink-downlink subframes according to the results of clustering is further configured:

To determine the cluster where the base station itself resides; and

When the cluster where the base station itself resides includes only the base station itself, to configure TDD uplink-downlink subframes of the base station without being restricted by TDD uplink-downlink subframes configured by the other base stations in the preset region; or When the cluster where the base station itself resides includes at least two base stations, to configure the same TDD uplink-downlink subframe configuration as the other base station(s) in the cluster.

Fourth Embodiment

A particular process of a method for configuring TDD uplink-downlink subframes in a base station according to the invention will be described in connection with a particular application scenario thereof.

Taking a pico node in a pico cell, a preset region of a network is assumed in which 228 pico nodes are deployed.

The method for configuring TDD uplink-downlink subframes in a base station according to the invention includes the following particular steps:

1) A coupling loss between every two of the 228 pico nodes is calculated, and each pico node needs to calculate the coupling losses with the other 227 pico nodes respectively as nodes at the same frequency and different frequencies as described above;

2) Each pico node reports the coupling losses between the pico node and the other 227 pico nodes to an upper node, also referred to as a central node in the present embodiment;

3) The central node obtains a corresponding threshold T of coupling loss between every two pico nodes in a traversal and attempt manner;

4) The pico nodes are clustered at the central node by comparing the coupling loss between each pico node and each one of the other 227 pico nodes with the threshold T, and if pico nodes with the coupling losses below T are found, by determining those pico nodes to be at a short distance from the current pico node and classifying these pico nodes into the same cluster as the current pico node; or if the coupling loss between the current pico node and each one of the other 227 pico nodes is above T, then by determining all the other 227 pico nodes to be at a long distance from the current pico node so that there is no threat of interference to the current pico node from any pico node close thereto and classifying the current pico node alone into a cluster (a cluster including only the current pico node);

5) For those clusters including more than one element (i.e., clusters including the current pico node and one or more pico nodes at a short distance thereto), an intersection operation is further performed on each of the clusters and each of other non-single-element cluster, and if there an intersection between the two clusters, then it indicates that there is a propagation effect between the two clusters, and the elements in the two clusters are unified into the same large cluster; or if there is a null intersection between the two clusters, then it is determined that there is no propagation effect between the two clusters and the elements in the original clusters are maintained; and 6) The central node feeds results of clustering back to each pico node, and each pico node configures flexibly TDD subframes according to the results of clustering fed back by the central node as follows:

Pico nodes in the same cluster are configured with the same TDD frames; and

Pico nodes in different clusters can be configured with TDD frames in any direction in compliance with the specification of the standard.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of configuring TDD uplink-downlink subframes for base stations, wherein the method comprises:

determining a coupling loss between every two of the base stations in a preset region;

clustering the base stations in the preset region according to the coupling loss between every two of the base stations;

the base stations configuring TDD uplink-downlink subframes according to results of clustering, wherein the base stations in a same cluster are configured with a same TDD uplink-downlink subframe configuration, and the base stations in different clusters are configured with a same TDD uplink-downlink subframe configuration or different TDD uplink-downlink subframe configurations; and combining clusters, including at least two base stations and having at least one common base station, into a same cluster, and maintaining clusters including only one base station and clusters, including at least two base stations and having no base station in common with any other cluster, to obtain the results of clustering.

2. The method according to claim 1, wherein if the coupling loss and the results of clustering are determined by an upper node of all the base stations or a specified base station or any one of the base stations in the preset region, then clustering the base stations in the preset region according to the coupling loss between every two of the base stations comprises:

classifying each of the base stations into a cluster, and judging whether to classify each of other base stations than the each of the base stations in the preset region into the cluster to which the each of the base stations belongs according to the coupling loss between the each of the base stations and the each of other base stations.

3. The method according to claim 1, wherein when the coupling loss and the results of clustering are determined by an upper node of all the base stations, the upper node transmits indication information including the results of clustering to each of the base stations; or when the coupling loss and the results of clustering are determined by the specified base station or any one of the base stations in the preset region, a specified base station or any one of the base stations in the preset region transmits indication information including the results of clustering to each of other base stations.

4. The method according to claim 3, wherein the upper node transmitting the indication information including the results of clustering to each of the base stations comprises:

transmitting information about all the clusters as the results of clustering and all the base stations in the clusters to each of the base stations; or transmitting information about all the base stations in the cluster where each of the base stations resides to the each of the base station; and the specified base station or any one of the base stations transmitting the indication information including the results of clustering to each of other base stations comprises:

transmitting information about all the clusters as the results of clustering and all the base stations in the clusters to each of other base stations; or transmitting information about all the base stations in the cluster where each of other base stations resides to the each of other base stations.

5. The method according to claim 1, wherein when the coupling loss and the results of clustering are determined by an upper node of all the base stations or a specified base station or any one of the base stations in the preset region, determining the coupling loss between every two of the base stations in the present region comprises:
   determining the coupling loss between every two of the base stations in the present region according to the coupling loss between each of the base stations and each of other base stations.

6. The method according to claim 5, wherein the coupling loss between each of the base stations and each of other base stations is determined by any one of:
   determining the coupling loss between the each of the base stations and the each of other base stations according to reference signal transmitted power of the each of other base stations and Reference Signal Received Power (RSRP) of the each of other base stations measured by the each of the base stations; or
   determining the coupling loss between the each of the base stations and the each of other base stations by comparing RSRP of the each of other base stations measured by the each of the base stations with a preset threshold and; or
   determining the coupling loss between the each of the base stations and the each of other base stations based upon measurement parameters, for calculation of a coupling loss, measured by two base stations; or
   retrieving directly the coupling loss, between the each of the base stations and the each of other base stations in the preset region, determined in advance by simulating measurement parameters, for calculation of a coupling loss, measured between two base stations using network planning software.

7. The method according to claim 6, wherein when the coupling loss between every two of the base stations in the preset region is determined by the upper node,
   each of the base stations determines and reports the coupling loss between the each of the base stations and each of other base stations to the upper node; or
   each of the base stations reports RSRP of each of other base stations measured by the each of the base stations to the upper node; or
   each of the base stations reports its reference signal transmitted power and RSRP of each of other base stations measured by the each of the base stations to the upper node; and
   when the coupling loss between every two of the base stations in the preset region is determined by the specified base station or any one of the base stations,
   each of the base stations other than the specified base station or the any one of the base stations determines and reports the coupling loss between the each of the base stations and each of other base stations to the specified base station or the any one of the base stations; or
   each of the base stations other than the specified base station or the any one of the base stations reports RSRP measured by the each of the base stations to the specified base station or the any one of the base stations; or
   each of the base stations other than the specified base station or the any one of the base stations reports reference signal transmitted power of the each of the base stations and RSRP of each of other base stations measured by the each of the base stations to the specified base station or the any one of base stations.

8. The method according to claim 1, wherein each of the base stations in the preset region determines the coupling loss between the each of the base stations and each of other base stations, and performs clustering according to the coupling loss between the each of the base stations and each of other base stations by:
   classifying the each of the base stations into a cluster and judging whether to classify each of other base stations into the cluster to which the each of the base stations belongs according to the coupling loss between the each of the base stations and the each of other base stations.

9. The method according to claim 8, wherein the coupling loss between the each of the base stations and each of the other base stations is determined by any one of:
   determining the coupling loss between the each of the base stations and the each of other base stations according to reference signal transmitted power of the each of other base stations and Reference Signal Received Power (RSRP) of the each of other base stations measured by the each of the base stations; or
   determining the coupling loss between the each of the base stations and the each of other base stations by comparing RSRP of the each of other base stations measured by the each of the base stations with a preset threshold and; or
   determining the coupling loss between the each of the base stations and the each of other base stations based upon measurement parameters, for calculation of a coupling loss, measured by two base stations; or
   retrieving directly the coupling loss, between the each of the base stations and the each of other base stations in the preset region, determined in advance by simulating measurement parameters, for calculation of a coupling loss, measured between two base stations using network planning software.

10. The method according to claim 1, wherein the base stations configuring TDD uplink-downlink subframes according to the results of clustering comprises:
   determining a cluster where each of the base stations itself resides; and
   when the cluster where each of the base stations itself resides includes only the each of the base stations itself, configuring TDD uplink-downlink subframes of the each of the base stations without being restricted by TDD uplink-downlink subframe configurations of other base stations in the preset region; or
   when the cluster where each of the base stations itself resides includes at least two base stations, configuring a same TDD uplink-downlink subframe configuration as other base station(s) in the cluster.

11. The method according to claim 2, wherein judging whether to classify each of other base stations into the cluster to which the each of the base stations belongs comprises:
   comparing the coupling loss between the each of the base stations and each of other base stations in the preset region with a preset threshold; and
   when the coupling loss between the each of the base stations and one of other base stations is not above the preset threshold, classifying the one of other base stations into the cluster to which the each of the base stations belongs; otherwise, not classifying the one of other base stations into the cluster to which the each of the base stations belongs.

12. The method according to claim 11, wherein different preset thresholds are preset for different combinations of types of base stations, and comparing the coupling loss between two base stations with the preset threshold comprises:
   determining a preset threshold corresponding to a combination of types to which the types of the two base stations belong and comparing the coupling loss between the two base stations with the corresponding preset threshold.

13. The method according to claim 11, wherein the preset threshold is derived by any one of:
presetting the preset threshold according to an empirical value of coupling loss corresponding to a different extent of interference between the base stations; or
testing a data transmission condition where each of the base stations configures TDD uplink-downlink subframes according to the results of clustering and presetting the preset threshold according to a result of test; or
initially presetting a preset threshold and simulating a transmission condition where the base stations in the preset region are clustered at the preset threshold, and
adjusting the preset threshold according to a result of simulation and deriving the preset threshold until the simulated transmission condition where the base stations are clustered at the adjusted preset threshold satisfies a preset condition.

14. The method according to claim 8, wherein judging whether to classify each of other base stations into the cluster to which the each of the base stations belongs comprises:
comparing the coupling loss between the each of the base stations and each of other base stations in the preset region with a preset threshold; and
when the coupling loss between the each of the base stations and one of other base stations is not above the preset threshold, classifying the one of other base stations into the cluster to which the each of the base stations belongs; otherwise, not classifying the one of other base stations into the cluster to which the each of the base stations belongs.

15. The method according to claim 14, wherein different preset thresholds are preset for different combinations of types of base stations, and comparing the coupling loss between two base stations with the preset threshold comprises:
determining a preset threshold corresponding to a combination of types to which the types of the two base stations belong and comparing the coupling loss between the two base stations with the corresponding preset threshold.

16. The method according to claim 14, wherein the preset threshold is derived by any one of:
presetting the preset threshold according to an empirical value of coupling loss corresponding to a different extent of interference between the base stations; or
testing a data transmission condition where each of the base stations configures TDD uplink-downlink subframes according to the results of clustering and presetting the preset threshold according to a result of test; or
initially presetting a preset threshold and simulating a transmission condition where the base stations in the preset region are clustered at the preset threshold, and
adjusting the preset threshold according to a result of simulation and deriving the preset threshold until the simulated transmission condition where the base stations are clustered at the adjusted preset threshold satisfies a preset condition.

17. A base station for configuring TDD uplink-downlink subframes, wherein the base station comprises:
a loss determining unit configured to determine a coupling loss between every two of base stations in a preset region;
a clustering unit configured to cluster the base stations in the preset region according to the coupling loss between every two of the base stations;
a cluster indicating unit configured to transmit indication information including results of clustering to each of other base stations than the base station; and
a subframe configuring unit configured to configure TDD uplink-downlink subframes according to the results of clustering, wherein the base stations in a same cluster are configured with a same TDD uplink-downlink subframe configuration, and the base stations in different clusters are configured with a same TDD uplink-downlink subframe configuration or different TDD uplink-downlink subframe configurations; and
to combine clusters, including at least two base stations and having at least one common base station, into a same cluster, and to maintain clusters including only one base station and clusters, including at least two base stations and having no base station in common with any other cluster, to obtain the results of clustering.

18. The base station according to claim 17, wherein the clustering unit configured to cluster the base stations in the preset region according to the coupling loss between every two of the base stations is further configured:
to classify each of the base stations into a cluster and to judge whether to classify each of other base stations than the each of the base stations in the preset region into the cluster to which the each of the base stations belongs according to the coupling loss between the each of the base stations and the each of other base stations.

19. A base station for configuring TDD uplink-downlink subframes, wherein the base station comprises:
a loss determining unit configured to determine a coupling loss between current base station and each of other base stations in a preset region;
a clustering unit configured to cluster the current base station according to the coupling loss between the current base station and each of other base station; and;
a subframe configuring unit configured to configure TDD uplink-downlink subframes according to results of clustering, wherein base stations in a same cluster are configured with a same TDD uplink-downlink subframe configuration, and base stations in different clusters are configured with a same TDD uplink-downlink subframe configuration or different TDD uplink-downlink subframe configurations; and
to combine clusters, including at least two base stations and having at least one common base station, into a same cluster, and to maintain clusters including only one base station and clusters, including at least two base stations and having no base station in common with any other cluster, to obtain the results of clustering.

20. The base station according to claim 19, wherein the clustering unit configured to cluster the current base station is further configured:
to classify the current base station into a cluster and to judge whether to classify each of other base stations into the cluster to which the current base station belongs according to the coupling loss between the current base station and each of other base stations as the result of clustering of the current base station.

* * * * *